June 15, 1943. W. H. GREEN Re. 22,335

LIQUID FLOW CONTROL

Original Filed April 29, 1938 2 Sheets-Sheet 1

INVENTOR.

Walter H. Green

June 15, 1943. W. H. GREEN Re. 22,335

LIQUID FLOW CONTROL

Original Filed April 29, 1938 2 Sheets-Sheet 2

INVENTOR.

Walter H. Green

Reissued June 15, 1943

Re. 22,335

UNITED STATES PATENT OFFICE 22,335

LIQUID FLOW CONTROL

Walter H. Green, Batavia, Ill., assignor to Infilco Incorporated, a corporation of Delaware Original No. 2,296,247, dated September 22, 1942, Serial No. 204,994, April 29, 1938. Application for reissue October 30, 1942, Serial No. 464,153

11 Claims. (Cl. 210—122.1)

This invention relates to liquid flow control and measurement and in particular to such control and measurement for filtering apparatus and the like. For purposes of illustration I will show and describe my invention in combination with a sand filter of the gravity type for filtering water, although the invention can be applied to other systems and processes as well. The general construction and operation of flow controllers and liquid treating devices of the filter type are well understood and for this reason the description which follows, in so far as clarity permits, limited to the specific features provided or modified in accordance with my invention.

Sand filters are generally operated in cycles and a typical cycle includes the main steps of downwardly filtering raw water through the sand bed to purify the water and upwardly washing the bed with water to clean the sand. Additional steps such as draining to effluent, surface wash, filtering to waste, etc., may be incorporated in the cycle, but these do not need to be considered for the purposes of describing this invention.

In draining to effluent and filtering to waste, which operations are more or less standard, the same rate of flow may be used as during the filtering function, but for the backwash it is generally necessary to not only reverse the direction of flow but to control the rate of flow to a rate commonly five or more times as great as the filtering rate, the filtering rate being usually 2 to 3 gallons per square foot per minute. The flow pressures which are ordinarily used to measure or control a flow and especially a flow of relatively large magnitude in or through a closed conduit, vary with the squares of the flow velocities, making the total range of such pressures in filter practice very large indeed. As a consequence it is a serious problem how to cover such a wide range by a single control or measuring apparatus which affords a sufficiently precise response and is otherwise adapted for the service described and referred to.

Many attempts have been made to provide methods and apparatus for this purpose, but these have involved complications. Pressure differentials were practically invariably relied upon; but either the means for deriving or responding to such differentials have been duplicated so that two small ranges of liquid flow could be handled separately, involving excessive cost for such duplicate means; or compound means have been provided to secure the measurement of two or more separate ranges by a single device, making the construction of the same more complicated and expensive and reducing the efficiency of measurement and control. Usually also manual adjustment had to be made in such devices incident to each change of flow rate required by an operating cycle, adding unduly to the complexity of operation. The alternative method of measuring a flow over an open weir is not generally practical for purposes considered herein due to reasons which are obvious to those skilled in the art, particularly where the flows are in reverse directions. It is therefore common practice to alternately use two separate flow controllers, one for the filtering flow control and the other for backwash control.

In Patent No. 2,223,623, I have proposed, together with R. J. Koupal, among other things to construct a rate of flow controller covering two or more flow ranges and comprising a single pressure differential deriving device, a single differential responsive device, and a plurality of rate setting members selectively interposed between or otherwise selectively associated with said differential deriving and responsive devices. Such a controller can be constructed without duplication of, or undesirable complications in, the main operating elements thereof. With the present invention I have carried the same ideas further and in this respect my invention is a continuation in part of said Patent No. 2,223,623. I now propose certain structures which are still less complicated and expensive than those of that application and at the same time as efficient.

Prior devices have required at least one measuring orifice or nozzle, such as a Venturi tube, has been interposed in the system of main conduits leading to each filter for control and measurement of such flows. The larger a filter is, the larger are these conduits, and the larger and more expensive is any such Venturi structure. Furthermore, while most of the loss of head prevailing at the throat of such a tube is recovered, the nonrecoverable portion may represent an appreciable part of the total head available, and its loss will shorten filter runs and require more frequent backwashing, which in turn means more water and time lost in backwashing. It is a main advantage of my present invention that it obviates the necessity of such Venturi tubes or nozzles and so materially reduces the cost of installation and operation incurred in the prior practice. While so reducing the cost, I am able to provide a very accurate control and measurement over a wide range of flows, securing excellent operating results.

Another important feature is the substantial saving in space obtained by the elimination of the Venturi tube commonly used for obtaining a pressure differential.

It is a general object of my invention to provide a measurement and control for liquid flow and in particular, for multiple flows, which is free from the limitations aforementioned, and reduces the costs and complexities of installation and operation.

Another general object is to provide control or measurement of a liquid flow without any restriction in said flow other than is inherently necessary for operation.

Another object is to provide in a liquid flow system wherein a main flow is divided into a plurality of individual streams and thereafter reunited, control or measurement of flow from pressure across restrictions necessary to such division.

Another object is to provide liquid treating apparatus wherein flow measurement or control is derived from a flow distributing system which at the same time serves other purposes.

Still other objects and benefits will appear to those skilled in the art on consideration of the following detailed description and of the appended drawings.

In the drawings Fig. 1 is a plan view of one embodiment of my invention.

Figure 1:
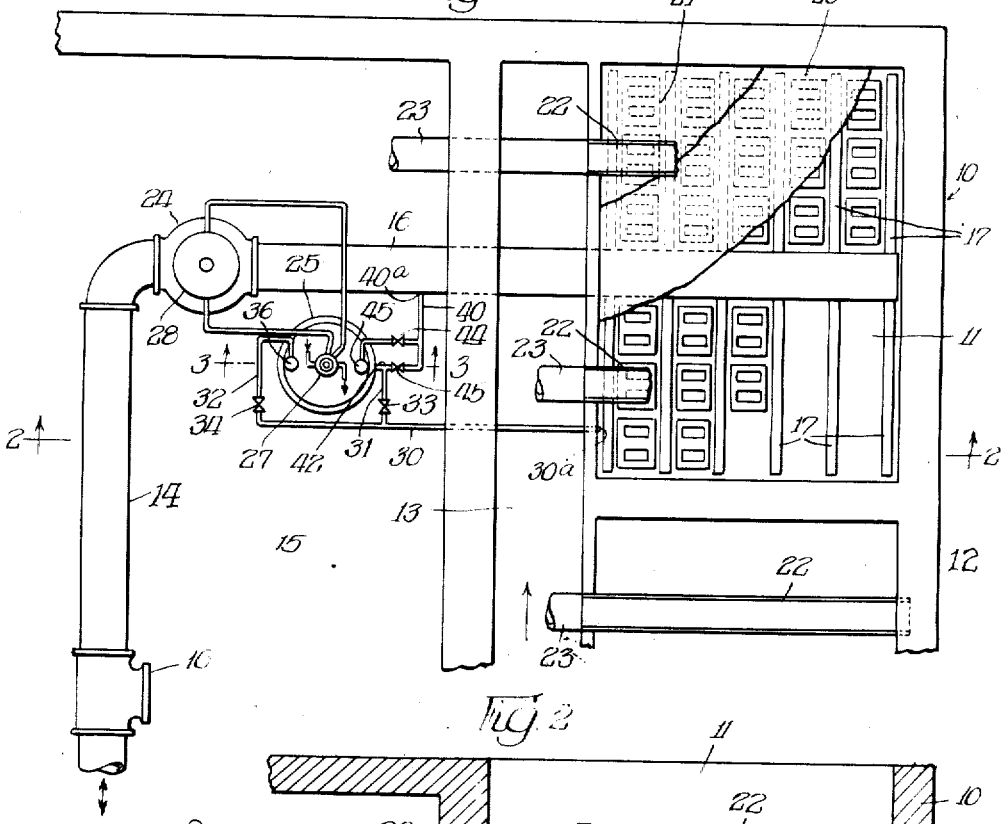
Figure 2:
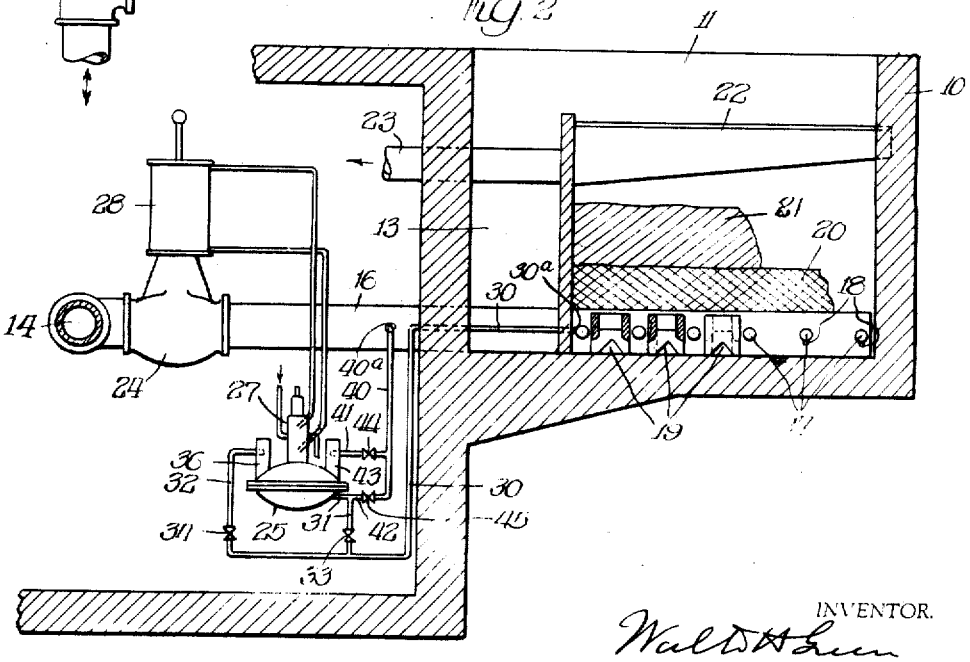
Fig. 2 is a sectional elevation of the apparatus shown in Fig. 1, the section being taken along lines 2—2 of Fig. 1.
Figure 3:
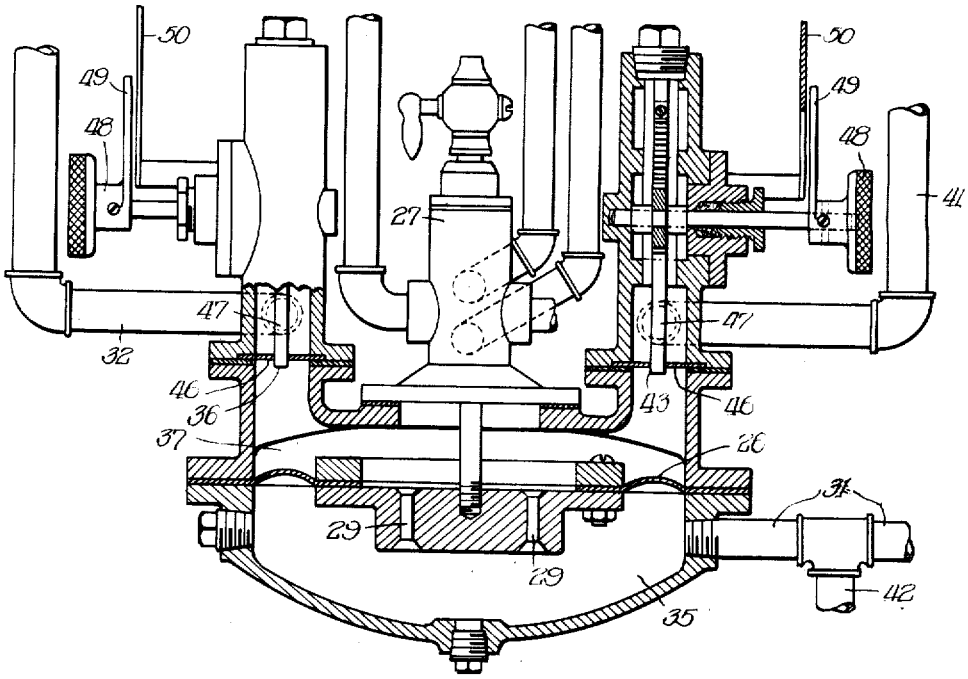
Fig. 3 is a sectional and enlarged elevation of the actuator shown in Figs. 1 and 2, the section being taken along lines 3—3 of Fig. 1.

Ordinarily a filter plant comprises a battery, 10, of individual filter beds, such as 11 and 12, the latter being only indicated in part. Usually such a filter battery, 10, is supplied by a common influent conduit, 13, and filtered water is removed by a common effluent and backwash header, 14, disposed in pipe gallery 15. Each filter has an underdrain system including underdrain header 16 and lateral pipes 17 with distributor holes or openings 18 formed therein, the function of which will be hereinafter referred to in more detail. In the preferred embodiment shown, laterals 17 are disposed between and protected by underdrain blocks 19 which support graded layers of gravel 20 and sand 21. In the upper part of each filter the usual wash water troughs 22 and outlets 23 are provided. The flow in the several pipes and conduits may be manually or automatically controlled by the necessary valves (not shown) as is well understood in the light of common practice.

Flow control valves 24 are interposed on the underdrain headers 16 and are associated with actuators 25 which include diaphragms or other differential responsive means 26; valve 24 being actuated from diaphragm 26 either directly or by means of an intermediate pilot 27 and pressure cylinder 28, or similar devices known to the art. In general the flow control device here shown for purpose of exemplification is of the type known from Adelson's Patent No. 1,934,759, there being provided a by-pass including one or more fixed orifices or nozzles 29 and a variable orifice or other means for varying the proportion of a derived differential effective on diaphragm 26.

The by-pass wherein said fixed orifice 29 is provided, includes a lead 30 connected to the lower part of filter 11 outside of laterals 17 and header 16 by means of a mouthpiece or nipple 30*a*. Lead 30 has two branches 31 and 32, including respectively the valves 33 and 34 and connected respectively to the high pressure chamber 35 and, through variable orifice 36, to the low pressure chamber 37 of actuator 25. The by-pass also includes a lead 40 which in the embodiment shown joins underdrain header 16 at a point 40*a* selected so that friction loss between it and orifices 18 will be minimized. However, the friction loss will be constant for any given flow and can be compensated for if in any case this should be desirable, by well known means not shown. Instead of joining underdrain header 16, lead 40 may join a lateral 17 at a point that is suitable for the same purpose, and other modifications will occur to any person skilled in the art. Lead 40 as shown has two branches 41 and 42 joining respectively low pressure chamber 37 through variable orifice 43 and high pressure chamber 35, and including respectively valves 44 and 45. The two pairs of valves 33 and 44, 34 and 45, may be adapted to be operated manually or automatically, as will be hereinafter explained. The variable orifices or openings 36 and 43 are preferably formed by the insertion in fixed orifice plates 46 of shaped plungers 47, the position of which is adjustable by wheels 48. The latter may have pointers 49 attached thereto, which move over graduated scales 50.

By an arrangement of this kind, orifices 36 and 43 can be so adjusted by wheels 48 that at desired rates of flow through the filter, the by-pass flow brings just so much pressure under diaphragm 26 as is sufficient and necessary to balance the weight of the diaphragm and parts mounted thereon. Actuator 25 will then automatically act to maintain the given rate of filtering or backwash flow through valve 24.

The by-pass described is connected across the orifices in the underdrain system comprising underdrain header 16 and laterals 17. As in modern filtering practice these orifices are carefully made and proportioned for the purpose of securing uniform distribution of flow, the pressure drop across them is indicative of rate of flow the same as a differential derived by a single orifice. This differential or a function thereof is applied on diaphragm 26 and flow governed thereby to any desired rate or rates.

It is obvious to persons skilled in the art how the individual flows and differentials referred to can be calculated and how they can be rendered more or less uniform, for purposes of flow distribution. It is similarly obvious that in an underdrain system properly laid out with regard to uniform flow distribution, equal or nearly equal flows occur through all openings 18, and that in all events the several flows through the same are proportional and will average to a differential usable for the indicated purpose. Similarly I may also use the pressure differential across any part of the underdrain system or the differential across any one of the openings between the underdrain system and filter 11, instead of a differential derived in or from the total flow through all.

Figure 4:
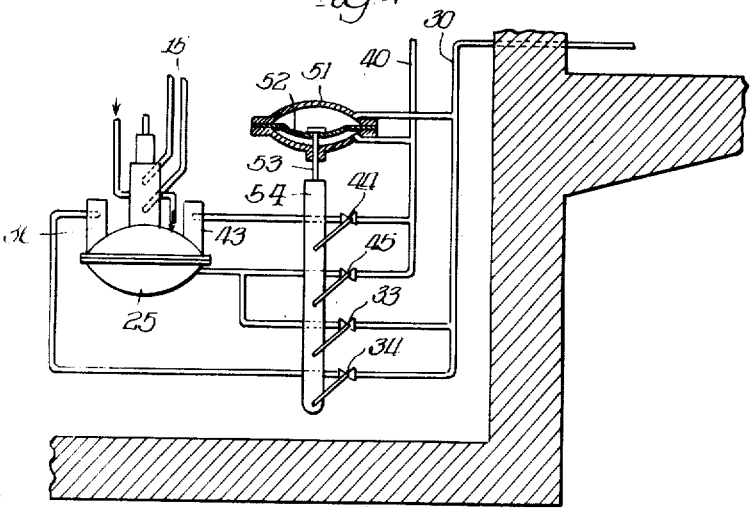
Fig. 4 is a partial sectional view showing means of automatically changing the control from one rate to another.

The higher pressure will sometimes be on one side of orifices 18 and sometimes on the other, depending on the direction of flow. During filtering water enters the top of the filter through conduits 13, flowing down through the sand and gravel, through the orifices 18 into the laterals 17 and to header 16, and obviously during this period the pressure at 30a exceeds that at 40a. Conversely during backwashing the water enters through header 16, passing out through orifices 18 to rise through the gravel and sand to cleanse same. This reversal of pressure direction may be used to automatically shift the controller from one control rate to another and means for this are illustrated in Fig. 4.

In that figure leads 30 and 40 are shown connected respectively to the top and bottom chamber of a diaphragm casing 51 in which is weighted diaphragm 52. A rod 53, connected to diaphragm 52, passes out through the casing and is joined to a link 54 to which are attached levers operating valves 33, 34, 44 and 45. The position of diaphragm 52 is shown as during the filtering operation. At this time the pressure in line 30 is greater than in line 40 and this pressure acts with the weight on the diaphragm and that of parts 53 and 54, so as to cause the diaphragm 52 to sink, moving the levers to open valves 33 and 44 and to close valves 34 and 45, so that the bypass flow is through variable orifice 43 which is set to control to the desired filter rate. If now the valves controlling flow to and from the filter be set to change operation from filtering to backwashing the direction of pressure will be reversed and that in line 40 will exceed that in line 30. As the backwash flow is necessarily very much greater, commonly at least five times greater, than that permissible during filtering, obviously the pressure differential from line 40 to line 30 during backwashing will be much greater than the reverse differential during filtering. Due to this greater available pressure the weight on the diaphragm 52 will be overcome and the link 54 raised to shift the levers to close valves 33 and 44 and open valves 34 and 45. This stops flow through orifice 43 and opens its through orifice 36 which is set to govern to the desired backwash rate. On cessation of the backwash flow the pressure will equalize and the diaphragm 52 drop and the valves 33 etc. be rest for filtering to be resumed.

In operation of the system shown, water to be filtered flows from the inlet conduit 13 through sand 21, gravel 20, underdrain blocks 19, openings 18, laterals 17, underdrain header 16 and control valve 24 to service. The sand bed 21 will gradually compact and its top layer will clog up, increasing the loss of head through the filter and tending to decrease the rate at which the water flows into openings 18 and through laterals 17 and header 16. While filtration is going on, there will be a tendency to progressively slow down the rate of flow through the filter, which tendency must be overcome by proper compensation for the increasing loss of head. For this purpose, a primary bypass flow is established from nipple 30a through lead 30, valve 33, branch 31, high pressure chamber 35, fixed orifice 29, low pressure chamber 37, variable orifice 43, branch 41, valve 44, and lead 40 to point 40a; valves 34 and 45 being closed at this time. By applying to diaphragm 26 the drop of pressure between points 30a and 40a, reduced by such head as is absorbed by orifice 43, I achieve a very accurate and at the same time an extremely simple control of the filter rate, due to the function of actuator 26 as aforementioned. Control of the backwash flow, which becomes necessary after the loss of head had reached its allowable limit and the flow system has been thrown into backwashing position, is had just as simply and accurately in a manner that will be understood from the preceding description, the rate of flow during backwashing being governed to the rate set at orifice 36.

It will be apparent that valves 33, 34, 44, 45, also one or the other of orifices 36 and 43 with its plunger may be dispensed with, permitting simplification of the piping forming the bypass, but in this event it will be desirable to put shut off valves in leads 30 and 40 to permit opening or removal of the actuator for inspection or repair. If parts referred to are omitted, including, for example, orifice 43 with its plunger, then it will be necessary to reset plunger 47 associated with orifice 36 each time it is desired to change between filtering and backwash flow control. It is apparent also that this plunger may be automatically reset to one position or the other by means as shown in Fig. 4, the link 54 being joined to plunger 47 instead of to the valve, and stops provided to arrest the motion at the desired points.

The term "filter" as used herein is limited to the filter bed container and the parts enclosed thereby. The term is not used to include the conduit, valves and other apparatus which lie outside of the filter container wall.

Having now set forth my invention and described a preferred embodiment thereof, I wish it understood that my invention is not limited by the particular forms thereof used herein for illustrative purposes. Such variations in construction, application and operation as are possible and permissible and as may occur to these skilled in the art are intended to be included in the appended claims.

I claim:

1. In a filter, a container, a filter bed therein, a flow system comprising a perforated underdrain underlying said bed and a conduit joined to said underdrain, a valve in said conduit, a power operated means for positioning said valve, a pressure differential sensitive member controlling the flow of power to said power operated means, and conduits for transmitting pressure joining said pressure differential sensitive member to said flow system between said valve and said filter bed and to said container.

2. The apparatus of claim 1 wherein the pressure differential sensitive member has a plurality of rate setting members, and selector means to render any one of said rate setting members operative at any one time.

3. Apparatus as claimed in claim 1 wherein the pressure differential sensitive member has a rate setting member adapted to be moved to different positions to control flow to different values, a second pressure differential sensitive member comprising a diaphragm, conduits joining opposite sides of said last named pressure differential sensitive member to points inside and outside of said flow system, and a member joining said last-named pressure differential sensitive member to said rate setting member.

4. In liquid purifying apparatus, a granular bed, an underdrain underlying said bed having perforations for flow into and from the granular bed, a rate of flow controlling device connected to said underdrain and adapted to be actuated by a pressure differential, and means for transmitting to said controlling device a pressure differential caused by flow through said perforations comprising pressure conduits connecting said controlling device to the lower portion of the granular bed and to the underdrain.

5. The apparatus of claim 1 wherein said pressure differential sensitive member has a plurality of rate setting members, means operable to electively utilize any one of said rate setting members, a second pressure sensitive member operating the means to electively utilize a rate setting member and conduits for transmitting pressure joining said last mentioned pressure sensitive member to said flow system between said valve and said filter bed and to said container.

6. In a filter unit provided with a filter bed and a perforated underdrain, the method of controlling the flow through the filter which comprises governing the flow from a loss in pressure resulting from the flow through the perforations of the underdrain in a manner to maintain said loss at a predetermined value.

7. A water treating apparatus comprising a chamber, a pervious treating bed therein, a water distribution system underlying said bed, a plurality of flow openings in said distribution system, a conduit joined to said distribution system, a valve in said conduit, a pressure differential sensitive member controlling the positioning of said valve, and pressure conduits joining said pressure differential sensitive member to points in the line of flow through said apparatus on opposite sides of said flow openings.

8. In filtering apparatus a filter chamber, a filter bed therein, a flow system comprising an underdrain system underlying said bed and a conduit joined to said underdrain system, a valve in said conduit, power operated means for positioning said valve, a pressure differential sensitive member controlling the flow of power to said power operated means, and pressure transmitting conduits connecting said pressure differential sensitive member to a point within said chamber and adjacent the bottom thereof and a point in the flow system between said valve and said filter bed.

9. A filter unit comprising a filter chamber, a filter bed therein, a flow system partially underlying said filter bed, a flow control valve in the flow system, a pressure differential responsive device for positioning said flow control valve, pressure transmitting conduits connecting said pressure differential responsive device to a point within said chamber and adjacent the bottom thereof and a point in the flow system between said valve and said filter bed, an interconnection between said conduits, valve means cooperating with said interconnection operable to reverse the pressures on the pressure differential responsive device, and means to position said last mentioned valve means upon reversal of flow through said flow system.

10. The apparatus of claim 1 wherein said pressure differential sensitive member is provided with a rate setting means for establishing rates of flow of different values, a second pressure differential sensitive member, conduits for transmitting pressure joining said second pressure differential sensitive member to two spaced points in said filter from which different pressures are secured, means connecting said second pressure differential sensitive member to said rate setting means to alter the rate of flow to a new value on reversal of pressure relation at said two spaced points.

11. In filtering apparatus a container, a filter bed therein, an underdrain having perforations for flow into and from the filter bed, a conduit joined to said underdrain, a pressure differential type flow controller on said conduit, and means for transmitting to said controller pressure from a point adjacent the bottom of said container and pressure from within the conduit intermediate the filter bed and the controller.

WALTER H. GREEN.

CERTIFICATE OF CORRECTION.

Reissue No. 22,355. June 15, 1943.

WALTER H. GREEN.

It is hereby certified that error appears in the printed specification of the above numbered patent requiring correction as follows: Page 1, first column, line 12, for "in" read --is--; page 3, first column, line 41, for "its" read --it--; line 45, for "rest" read --reset--; and second column, line 32, for "these" read --those--; and that the said Letters Patent should be read with this correction therein that the same may conform to the record of the case in the Patent Office.

Signed and sealed this 27th day of July, A. D. 1943.

Henry Van Arsdale,
Acting Commissioner of Patents.

(Seal)